United States Patent [19]
Kitajima et al.

[11] Patent Number: 5,582,886
[45] Date of Patent: Dec. 10, 1996

[54] POLYIMIDE COMPOSITE TUBE AND METHOD OF MANUFACTURING THE SAME

[75] Inventors: Tadashi Kitajima, Taka-gun; Tetsuya Itagaki, Otsu; Takahiro Yoshida, Otsu; Yoshitaka Hongou, Otsu; Masafumi Matsumura, Kusatsu, all of Japan

[73] Assignee: I.S.T. Corporation, Japan

[21] Appl. No.: 531,297

[22] Filed: Sep. 20, 1995

Related U.S. Application Data

[63] Continuation of Ser. No. 167,360, Dec. 16, 1993, abandoned.

[30] Foreign Application Priority Data

Nov. 15, 1993 [JP] Japan .................... 5-284576

[51] Int. Cl.$^6$ ................ B32B 1/08; B29D 23/00
[52] U.S. Cl. ............ 428/36.91; 428/36.9; 428/35.9; 428/35.7; 428/422; 428/473.5
[58] Field of Search .................. 428/35.7, 35.9, 428/36.9, 36.91, 422, 473.5

[56] References Cited

U.S. PATENT DOCUMENTS 5,021,109  6/1991  Petropoulos et al. ............ 156/137

FOREIGN PATENT DOCUMENTS

| | | |
|---|---|---|
| 436033 | 10/1991 | European Pat. Off. |
| 1-156017 | 6/1989 | Japan. |
| 3-180309 | 8/1991 | Japan. |
| 3-261518 | 11/1991 | Japan. |

OTHER PUBLICATIONS

Database WPI; Week 9012; Derwent Publications Ltd., London, GB; AN 90-088400 & JP-A-02 043 046 (Nitto Denko) 13 Feb. 1990 *abstract*.

Database WPI; Week 9330; Derwent Publications Ltd., London, GB; AN 93-240082 & JP-A-05 163 360 (Nitto Denko) 29 Jun. 1993 *abstract*.

Database WPI; Week 9329; Derwent Publications Ltd., London, GB; AN 93-231999 & JP-A-05 154 963 (Nitto Denko) 22 Jun. 1993 *abstract*.

*Primary Examiner*—W. Robinson H. Clark
*Attorney, Agent, or Firm*—Fish & Richardson, P.C.

[57] ABSTRACT

A seamless polyimide composite tube which includes a polyimide layer, a conductive primer layer on the surface of the polyimide layer and a fluororesin layer on the surface of the primer layer and a method of manufacturing the composite tube.

21 Claims, 5 Drawing Sheets

3(a)

3(b)

POLYIMIDE COMPOSITE TUBE AND METHOD OF MANUFACTURING THE SAME

This application is a continuation of U.S. application Ser. No. 08/167,360, filed Dec. 16, 1993, now abandoned.

FIELD OF THE INVENTION

The invention relates to a seamless polyimide composite tube which comprises a polyimide layer, a conductive primer layer on the surface of the polyimide layer and a fluororesin layer on the surface of the primer layer. The invention also relates to a method of manufacturing the polyimide composite tube.

BACKGROUND OF THE INVENTION

Heat-resistant resins, which have excellent mechanical and chemical properties, have been molded into many different shapes such as films, tubes, rods, formed materials, coating materials, etc., and used as flexible printed substrates, heat-resistant electric wire insulating materials, magnetic tapes, and the like. Future additional uses of the heat-resistant resins are also likely to become apparent. The heat resistant resins are used typically as revolving and delivering belts or conveyor belts for light electrical sounders, or heat fixing belts for copiers, laser beam printers, and the like.

As a heat-fixing member of a fixing apparatus in order to fix toner developed on copying paper or decalcomania paper, a heat roller is generally used in copiers or laser beam printers that utilize electrophotographic technology. More specifically, the papers developed with toner are passed through an opening between a fixing roller having a heating mechanism (heat roller) and a pressure roller, one page following another, thereby heating, melting and then fixing the toner on the paper.

There has been research on the use of a polyimide tube, instead of the heat roller, for a fixing apparatus. The inside polyimide tube is equipped with a live roller, a tension roller and a heater. Copying paper developed with toner is supplied one after another to an opening between the polyimide tube and a backing-up roller, thus fixing toner on the paper. This fixing apparatus heats and fixes the toner at the surface of the polyimide tube via the heater. Therefore, different from the heat roller, this polyimide tube does not require time for heating itself, and can start fixing toner on paper as soon as the power supply switch of the fixing apparatus is turned on. In addition, the capacity of the heater used for this fixing apparatus is small, and the apparatus consumes little electricity.

When this fixing apparatus is used, the toner developed on copying paper is instantaneously melted and fixed on the paper by the heater employed inside the polyimide tube. Therefore, if the polyimide tube wall thickness is uneven, the toner cannot be melted evenly. As a result, an undesirable offset phenomenon occurs. In this sense, it is necessary to minimize any unevenness in the polyimide tube wall thickness much as possible.

When the polyimide tube having uneven internal diameters in a longitudinal direction is rotated by two or three rollers, the tube meanders in a longitudinal direction. Therefore, when the tube is used as a heat-fixing seamless belt, the tube is required to have precise cylindricity.

One example of a method of manufacturing polyimide tubes with uniform tube wall thickness is disclosed in Japanese Published Unexamined Patent Application No. Sho 62-19437. The polyimide tube is manufactured in the following steps:

pouring polyamic acid solution into a molding pipe such as a glass pipe, stainless pipe, or the like with a smooth internal surface;

holding the molding tube in a vertical position;

dropping a bullet-like object through the solution by its own weight, thereby forming a hole inside the solution;

heating and drying the solution inside the molding pipe, thus causing it to become imide by imide reaction and forming a tube; and extracting the tube from the molding pipe.

The inventors of the present invention also disclose another method in Japanese Published Unexamined Patent Applications No. Hei 3-180309 and No. 3-261518. In this method, a polyimide precursor solution such as polyamic acid solution is coated on the outside surface of a core. The solution on the core is then heated and dried, thus causing it to become imide by imide reaction and forming a tube. Finally, the tube is separated from the core.

However, since only an extremely thin tube can be formed by the method of Japanese Published Unexamined Patent Application Sho 62-19437, the tube has to be laminated repeatedly by repeating the forming, drying and heating steps of this method many times. It is also extremely difficult to extract the tube from the inside surface of the glass or stainless pipe. Since the polyimide tube is extracted from the inside of the pipe, a long polyimide tube with a small inside diameter can hardly be made. Moreover, when the polyimide tube is used as a fixing means for an electrophotographic printer or a laser printer to fix toner developed on copying papers at the tube surface via the heater, the tube's properties of separating the toner from itself are so critical that offset occurs. In other words, toner left on the tube is later printed on copying paper by the rotation of the tube, thus staining both the paper and the tube surface. Since the polyimide tube is also likely to generate static electricity, the toner, right before its fixation, is repulsed by the static, thereby blurring copy image and weakening resolution.

Similar to the above-noted problems, Japanese Published Unexamined Patent Applications No. Hei 3-180309 and No. Hei 3-261518 have problems of poor separation properties as well as static electricity of the polyimide tubes.

SUMMARY OF THE INVENTION

In order to solve the problems of conventional methods, the invention provides an anti-static seamless polyimide composite tube, which comprises a polyimide resin layer as a substrate and whose surface has good separation properties against toner; and a method of efficiently manufacturing the seamless polyimide composite tube.

In order to accomplish the above, the polyimide composite tube of the invention comprises a seamless layer, which contains polyimide as one of the principal ingredients, as a substrate. The outside surface of the seamless layer is coated with a conductive primer layer; the outside surface of the conductive primer layer, in addition, is coated with a baked fluororesin layer. Thus, the polyimide composite tube is formed.

It is preferable in this composition that the polyimide is contained in the seamless layer at about 90 mol %. Copolymerized polyamide can be contained in the layer up to about 10 mol %.

It is preferable in this composition that the seamless polyimide composite tube of the invention is manufactured as follows:

coating a polyimide precursor solution on the outside surface of a metallic cylinder;

casting the precursor solution with a metallic ring at a uniform thickness;

drying and heating the solution, thus forming a half-hard polyimide layer by a midway imide reaction;

coating a conductive primer layer on the surface of the half-hard polyimide layer;

coating a fluororesin layer on the surface of the conductive primer layer; and heating the half-hard polyimide layer coated with the conductive primer layer and the fluororesin layer to complete the imide reaction as well as to bake the fluororesin layer at the same time.

As used herein, uniform thickness refers to a thickness within ±15%, preferably ±12.5%, or ideally ±10% of 3–500 μm for a preferable thickness of the polyimide layer over the entire length of the layer.

It is preferable in this composition that the thickness of the polyimide layer (substrate) is from 3 μm to 500 μm.

It is also preferable in this composition that the conductive primer layer contains at least one compound selected from the group consisting of polyphenylenesulfide; polyethersulfone; polysulfone; polyamideimide; polyimide; derivatives of polyphenylenesulfide, polyethersulfone, polysulfone, polyamideimide, or polyimide; and fluororesin.

It is further preferable in this composition that the thickness of the conductive primer layer is from 0.5 μm to 10 μm and that the layer comprises an exposed area.

It is preferable in this composition that the surface electric resistance of the conductive primer layer is from $1\times10^{-2}$ Ω·cm to $1\times10^{7}$ Ω·cm.

It is also preferable in this composition that the conductive primer layer contains 1–40% by weight of carbon powder.

It is preferable in this composition that the fluororesin is at least one compound selected from the group consisting of polytetrafluoroethylene (PTFE), tetrafluoroethyleneperfluoroalkylvinylether copolymer (PFA), and tetrafluoroethylenehexafluoropropylene copolymer (FEP).

It is also preferable in this composition that the thickness of the fluororesin layer is from 2 μm to 30 μm.

It is further preferable in this composition that the fluororesin layer contains 0.1–3.0% by weight of carbon powder.

The method of manufacturing a seamless polyimide composite tube of the invention comprises the following steps:

coating a polyimide precursor solution on the outside surface of a metallic cylinder;

casting the precursor solution with a metallic ring at a uniform thickness;

drying and heating the solution, thus forming a half-hard polyimide layer by a midway imide reaction;

coating a conductive primer layer on the surface of the half-hard polyimide layer;

coating a fluororesin layer on the surface of the conductive primer layer; and heating the half-hard polyimide layer coated with the primer layer and the fluororesin layer to complete the imide reaction as well as to bake the fluororesin layer at the same time.

It is preferable in this method that a reduction ratio of the thickness of the polyimide layer at the midway imide reaction (before the completion of the imide reaction) is 50–95%. The reduction ratio is calculated by the following formula:

$$x=\{(V_o-V_a)/V_o\}\times100, \qquad \text{Formula 1}$$

wherein x represents reduction ratio of the thickness of the polyimide precursor layer;

$V_o$ represents the original thickness of the polyimide precursor solution right after the solution is coated on the metallic cylinder; and $V_a$ represents the thickness of the half-hard polyimide layer at the midway imide reaction.

The midway imide reaction of the half-hard polyimide layer can also be confirmed by an infrared absorption spectra analysis (IR). A titrimetric analysis of a —COOH group, —NH$_2$ group, and a —NH group can also determine if the polyimide layer is half-hard.

It is also preferable in this method that the fluororesin is at least one compound dispersed in water (compound dispersion), and that the compound is selected from the group consisting of polytetrafluoroethylene (PTFE), tetrafluoroethyleneperfluoroalkylvinylether copolymer (PFA), and tetrafluoroethylenehexafluoropropylene copolymer (FEP).

It is further preferable in this method that the fluororesin is coated on the surface of the primer layer by a dipping and holding method.

It is preferable in this method that the fluororesin is mixed with carbon black.

It is preferable in this method that the conductive primer is coated on the surface of the half-hard polyimide layer, which is formed on the surface of the metallic cylinder, and the fluororesin is then coated on the surface of the conductive primer layer.

It is also preferable in this method that the fluororesin is coated while the metallic cylinder is rotated.

It is preferable in this method that the polyimide precursor solution is an aromatic polyimide precursor solution, and that the viscosity of the solution is 50–10000 poise.

It is also preferable in this method that the thickness of the polyimide precursor solution coated on the metallic cylinder is 10–1000 μm.

It is preferable in this method that a metallic mold is arranged outside of the metallic cylinder at a fixed distance, and that at least one of the metallic cylinder and the metallic mold is shifted, thereby casting the polyimide precursor solution at a uniform thickness.

As used herein, uniform thickness refers to a thickness within ±15%, preferably ±12.5%, or ideally ±10% of 3–500 μm for a preferable thickness of the polyimide layer over the entire length of the layer.

It is also preferable in this method that the conductive primer layer contains 1–40% by weight of carbon powder.

It is further preferable in this method that the conductive primer solution is coated on the half-hard polyimide layer while the metallic cylinder is rotated.

One example of an apparatus for manufacturing the polyimide composite tube of the invention comprises the following:

a component for casting a polyimide precursor solution coated on the surface of a metallic cylinder at a uniform thickness;

a component for heating the polyimide precursor solution to make it dry or half-hard;

a component for coating conductive primer on the surface of the half-hard polyimide precursor layer;

a component for coating fluororesin; and a heating component to complete the imide reaction and to bake the fluororesin at the same time.

DETAILED DESCRIPTION OF THE INVENTION

Figure 1:
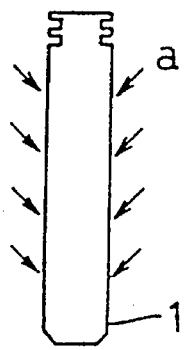
FIG. 1 is a flow diagram, showing manufacturing processes of a half-hard polyimide precursor layer of one embodiment of the invention.
Figure 1:
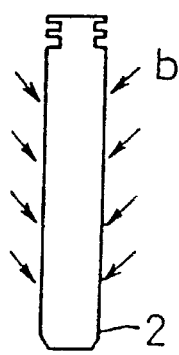
Figure 1:
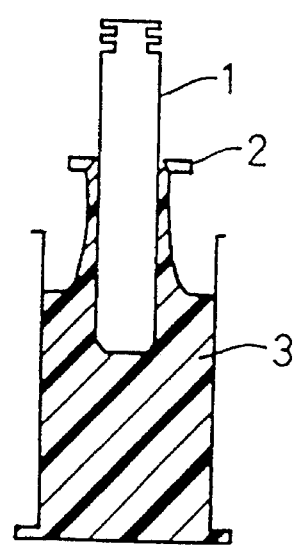
Figure 1B:
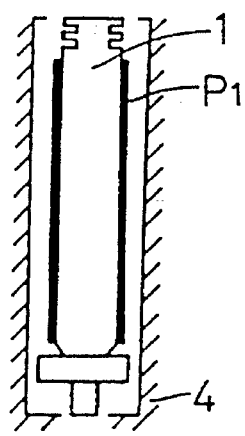
Figure 1C:
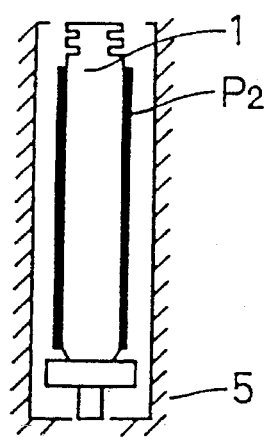
Figure 1D:
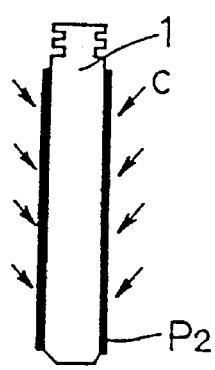
Figure 2E:
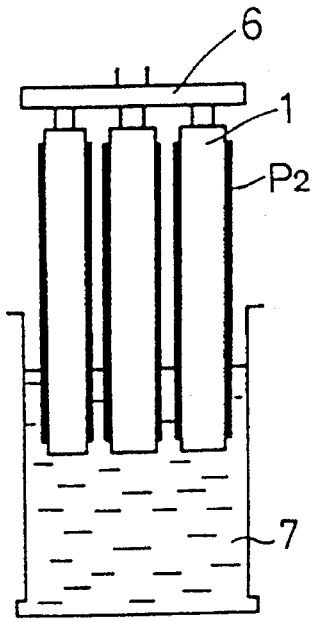
FIG. 2 is a flow diagram, showing manufacturing processes of a polyimide composite tube of the embodiment.
Figure 2F:
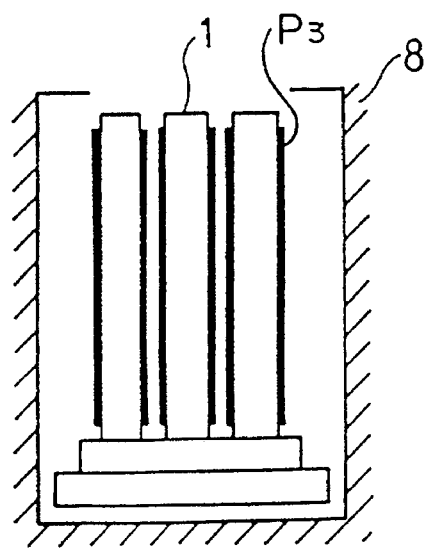
Figure 2G:
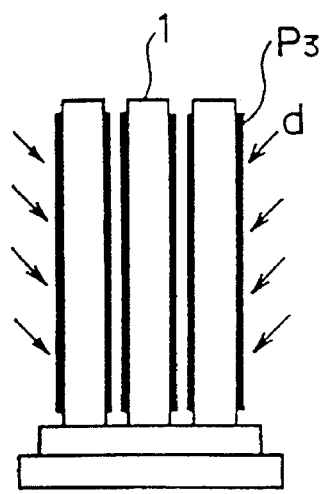
Figure 2H:
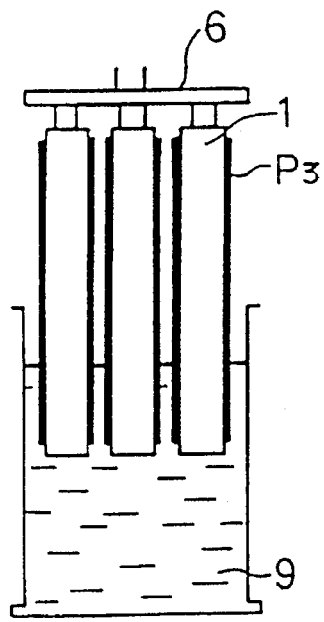
Figure 2I:
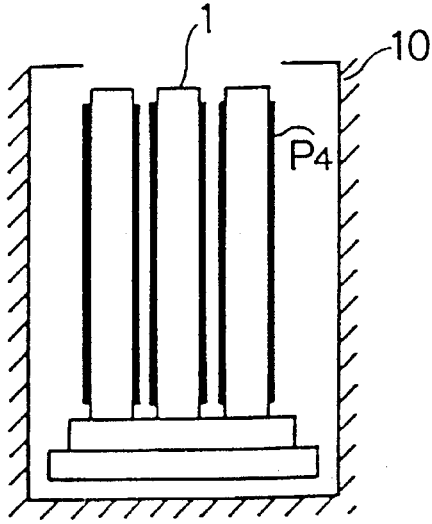
Figure 2J:
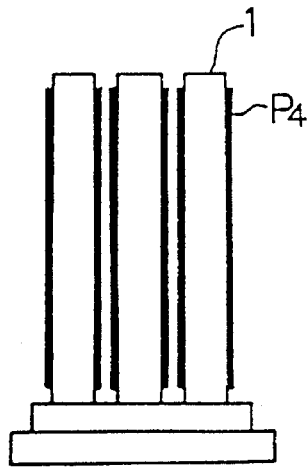

When the polyimide composite tube of the invention comprises a seamless polyimide layer as a substrate, a conductive primer layer on the outside surface of the polyimide layer, and a baked fluororesin layer on the outside surface of the primer layer, the polyimide composite tube is anti-static and seamless. In addition, the surface of the polyimide composite tube has excellent separation properties (properties of separating toner from the tube). The adherence between the fluororesin layer and the polyimide layer is significant enough to keep the tube together and to avoid the problems of separating each layer of the tube, or the like. In this sense, the polyimide composite tube of the invention can be practically used as a fixing means for an electrophotographic printer or a laser printer.

When the polyimide composite tube of the invention is formed by an imide reaction after heating and drying a polyimide precursor layer casted at a uniform thickness, the polyimide composite tube has a more uniform thickness. It can thus be used as a practical fixing means for an electrophotographic printer and a laser printer.

When the composition has a polyimide layer (substrate) having a thickness of 3–500 μm, the polyimide composite tube of the invention becomes even stronger.

The adherence between the fluororesin layer and the polyimide layer (substrate) becomes significant if the conductive primer layer comprises at least one compound selected from the group consisting of polyphenylenesulfide; polyethersulfone; polysulfone; polyamideimide; polyimide; derivatives of polyphenylenesulfide, polyethersulfone, polysulfone, polyamideimide, or polyimide; and fluororesin. Materials disclosed in Japanese Published Examined Patent Application No. Sho 53-33972 can be used as a material for the conductive primer layer.

If the thickness of the conductive primer layer is 0.5–10 μm, the adherence among the polyimide layer (substrate), the conductive primer layer, and the fluororesin layer improves further. If at least one edge of the polyimide composite tube exposes the conductive primer layer surface, electrostatic charge can be preferably discharged.

When the surface electric resistance of the conductive primer layer is from $1 \times 10^{-2}$ Ω·cm to $1 \times 10^{7}$ Ω·cm, the layer becomes significantly conductive.

When the conductive primer layer of the composition contains 1–40% by weight of carbon powder, the polyimide composite tube of the invention becomes more practical. In addition, carbon, gold, silver, aluminum, stainless steel powder, or the like can be contained in the conductive primer layer.

The separation properties of the polyimide composite tube against toner are particularly high, when the fluororesin is at least one compound selected from the group consisting of polytetrafluoroethylene (PTFE), tetrafluoroethyleneperfluoroalkylvinylether copolymer (PFA), and tetrafluoroethylenehexafluoropropylene copolymer (FEP). For example, by dipping and holding a metallic cylinder formed with a half-hard polyimide layer and a conductive primer layer in a solution (fluororesin dispersed in water) and baking the layer, a fluororesin layer with a flat and smooth surface can be preferably coated on the metallic cylinder.

A more preferable level of endurance for the polyimide composite tube can be obtained, if the thickness of the fluororesin layer is 2–30 μm.

It is preferable that the fluororesin layer contains 0.1–3.0% by weight of carbon powder so that no electrostatic offset is generated.

As described above, the seamless polyimide composite tube of the invention is manufactured by coating fluororesin on the surface of the half-hard polyimide layer in the middle of the imide reaction, and then heating the layer to complete the imide reaction and baking the fluororesin layer at the same time. As a result, a seamless polyimide composite tube which comprises a polyimide layer, a conductive primer layer and a fluororesin layer can be efficiently manufactured. More specifically, by not separating the treatments of completing the imide reaction and baking the fluororesin, thermal efficiency is improved, and the time required for these treatments can also be shortened. Moreover, in this composition, the polyimide and fluororesin can be strongly bonded together to form a single unit.

With a 50–95% reduction ratio of the thickness of the polyimide precursor, the handling of the polyimide precursor is easy enough to ensure efficient manufacture of the polyimide composite tube. When the solid part of the polyimide precursor is about 20% by weight of the precursor, the reduction ratio of the thickness is preferably about 70–95%. If the solid part is high, for example about 30–40% by weight of the polyimide precursor, about a 50–95% reduction ratio is practical in the invention.

The fluororesin is at least one compound dispersed in water (compound dispersion). The compound is selected from the group consisting of polytetrafluoroethylene (PTFE), tetrafluoroethylene-perfluoroalkylvinylether copolymer (PFA), and tetrafluoroethylene-hexafluoropropylene copolymer (FEP). Based on this composition, a heat-resistant seamless polyimide composite tube with excellent toner separation properties can be manufactured in the invention. By coating the fluororesin by a dipping and holding method, a fluororesin layer with a flat and smooth surface can be formed at a uniform thickness only for the area where such coating is needed. This dipping and holding method also does not require a masking method, or the like.

By mixing carbon black into the fluororesin, the seamless polyimide composite tube becomes anti-static.

By coating the fluororesin on the surface of a half-hard polyimide layer, the handling of the tubes is made easy for mass production, and dust is not likely to adhere to the tubes.

When the fluororesin is coated on a rotating metallic cylinder, the fluororesin can be coated at a uniform thickness.

A highly heat-resistant seamless polyimide layer can be manufactured if the polyimide precursor solution is an aromatic polyimide precursor solution. If the viscosity of the precursor solution is from 50 poise to 10000 poise, the seamless polyimide layer can be cast at a more uniform thickness.

If the thickness of polyimide precursor solution coated on the metallic cylinder surface is 10–1000 μm, the thickness of the polyimide seamless composite tube of the invention becomes preferable.

If a metallic mold is placed outside of a metallic cylinder at a fixed distance, and at least one of the metallic mold and the metallic cylinder is shifted to mold a polyimide precursor solution at a uniform thickness, a seamless polyimide layer can be efficiently molded at a uniform thickness.

A polyimide seamless composite tube, in which each layer is adhered in one body, can be manufactured by coating the primer and then the fluororesin on a half-hard polyimide precursor layer.

As noted above, one example of a manufacturing apparatus comprises a mechanism for coating polyimide precursor solution on the surface of a metallic cylinder at a uniform thickness, a mechanism for heating the polyimide precursor solution to make it dry or half-hard, a mechanism for coating fluororesin on the surface of a half-hard polyimide layer, and a mechanism for heating the layers to complete the imide reaction and bake the fluororesin layer at the same time. This apparatus can efficiently manufacture a seamless polyimide composite tube.

The imide reaction of a polyimide precursor solution can be completed by gradually increasing the temperature of the solution in consideration of the solvent evaporation and the time required for the imide reaction, and finally by heating up the solution nearly to a glass-transition temperature of the polyimide precursor solution. The roles of the solvent in the manufacturing method of the invention are as follows:

controlling the viscosity of the polyimide precursor solution;

permitting the polyimide reaction;

dissolving a polyimide precursor solution and keeping the chemical stability of the precursor solution; and being vaporized at a temperature below 300° C.

Such solvent includes N-methyl-2-pyrrolidone; N,N-dimethylacetamide; phenol; o-, m-, p-chlorphenol; o-, m-, p-bromphenol; 2-chlor-4-hydroxytoluene; 2-chlor-5-hydroxytoluene; 3-chlor-6-hydroxytoluene; and the like.

In one embodiment of the invention, the imide reaction as well as the evaporation of N-methyl-2-pyrolidone (NMP) is completed by heating polyamic acid on the surface of a metallic cylinder at about 120° C. for 60 minutes; the imide reaction is completed halfway at about 120° C. for 20 minutes of the heating treatment. NMP is the solvent contained in the polyimide precursor solution of this embodiment. In proportion to the coefficient of thermal expansion of the metal used for the metallic cylinder, the outside diameter of the metallic cylinder heated in an oven at about 200° C. expands. Accordingly, the inside diameter of the polyimide tube expands and becomes the same as the outside diameter of the metallic cylinder. Then, by performing a cooling step, both the outside diameter of the metallic cylinder and the inside diameter of the polyimide tube shrink back to their size at room temperature. In other words, the polyimide tube keeps its adherence to the surface of the metallic cylinder after the cooling step. Even though the polyimide precursor solution is a thermosetting resin, the solution which is heated to reach the middle stage of imide reaction can reduce its size in accordance with the shift of temperature from 200° C. to room temperature. Therefore, since the polyimide tube is completely adhered to the metallic cylinder, primer solution with low viscosity can hardly penetrate the gap between the outside surface of the metallic cylinder and the inside surface of the tube after dipping and holding the tube in the primer solution. In this sense, treatments such as a masking treatment are not required for the metallic cylinder contacting the primer solution and the edge of the tube in this dipping and holding treatment.

When the polyimide precursor solution is heated at 250° C. for 20 minutes to reach the halfway imide reaction stage, the property of the precursor solution as a thermosetting resin comes into effect. Therefore, even if the solution is cooled off down to room temperature, its inside diameter still stays equal to the outside diameter of the metallic cylinder at about 250° C. In this sense, while the outside diameter of the metallic cylinder shrinks after the cooling step, the inside diameter of the tube stays the same, generating a clearance between the metallic cylinder and the tube. As a result, the primer solution permeates the gap between the cylinder and the tube after dipping and holding the tube in the primer solution. Moreover, a similar phenomenon results if the primer solution is dried at a temperature above 200° C., and the dispersion permeates when the tube is dipped and held in a fluororesin solution.

On the other hand, when the polyimide precursor solution is heated at around 180° C. for twenty minutes, the progress of the imide reaction is too slow to make a complete polyimide tube. After dipping and holding this incomplete polyimide tube in the primer solution, the tube, aided by the water-absorptive property of NMP, becomes swollen with liquid. As a result, the tube is likely to have wrinkles, and cannot provide significant mechanical properties.

For these reasons, the temperature applied for heating and drying treatments of the invention is at a level that is the most suitable. However, the temperature level varies, depending on the materials of the metallic cylinders (coefficients of thermal expansion) and the kinds of polyimide precursor solutions and solvents.

In the method of manufacturing a polyimide composite tube of the invention, the tube can be manufactured without separating the tube from the metallic tube in the middle of the manufacturing processes. Particularly, in order to provide additional functions, the tube can be multilayered in this method.

The advantages of applying a dipping and holding treatment are as follows:

(1) forming a tube with little loss in a coating solution compared with a spray-coating method;

(2) providing a flat surface for a tube;

(3) treating many cores at one time;

(4) providing high precision in the thickness of a tube; and (5) easily arranging the thickness of a tube by changing the lifting speed of a core and the viscosity of a solution.

The invention will now be explained specifically in the following example.

EXAMPLE

FIG. 1 is a flow diagram, showing manufacturing processes of a half-hard polyimide layer of one embodiment. Letter A shows a process of coating and molding a polyimide precursor solution on the surface of a metallic cylinder at a uniform thickness (casting process of steps $A_1$–$A_3$); B shows a process of drying the casted polyimide precursor solution (drying process); C shows a process of heating the solution to carry out the imide reaction halfway (first heating process); D shows a cooling process.

FIG. 2 is a flow diagram, showing processes of coating fluororesin on the surface of a seamless polyimide layer of the embodiment. Letter E indicates a process of coating the primer; F is a process of drying the primer; G is a cooling process; H shows a process of coating fluororesin; I shows a process of heating the fluororesin to complete the imide reaction and bake the fluororesin (second heating process). A process of removing a polyimide seamless composite tube is not shown in these figures.

An aluminum cylinder 25 mm in outside diameter and 500 mm in length was dipped and held in an inorganic coating solution containing silicon oxide, thereby coating the solution on the surface of the aluminum cylinder. The aluminum cylinder was heated and baked at 150° C. for thirty minutes and then at 350° C. for thirty minutes, thus preparing a core covered with silicon dioxide. The thickness of the silicon dioxide was 2 μm, and its surface roughness measured by JIS-B0601 (Rz) was 0.8 μm.

As shown in FIG. 1, a process of washing an aluminum cylinder (core) 1 with water (a) and then drying the aluminum cylinder 1 with dry air (b) can be added to the casting process A. This process is useful for employing the aluminum cylinder repeatedly. Then, a polyimide precursor solution 3 is prepared by reacting both 3,3',4,4'-biphenyltetracarboxylic acid dianhydride and aromatic diamine (4,4'-diaminodiphenylether) in N-methyl-2-pyrolidone. After dipping and holding aluminum cylinder 1 in polyimide precursor solution 3 up to 400 mm, aluminum cylinder 1 was lifted from the container containing polyimide precursor solution 3. Then, an aluminum ring 2 (26 mm in inside diameter, 300 g in weight, and 45° in liquid contact angle) was placed on the top of the aluminum cylinder 1 coated with the polyimide precursor solution, and slid down along the cylinder by its own weight. As a result, a polyimide precursor layer 0.5 mm in thickness was formed on the surface of aluminum cylinder 1.

In the drying process B, a casted polyimide precursor layer $P_1$ is dried in a drier 4 at 120° C. for sixty minutes. In order not to provide the effect of hot air on polyimide precursor layer $P_1$, the layer was treated virtually without air movement.

In the first heating process C, the halfway imide reaction was promoted for polyimide precursor layer $P_1$ in an oven 5 at 200° C. for 20 minutes, thus providing a half-hard polyimide layer $P_2$. The reduction ratio of the thickness of the polyimide precursor layer calculated by Formula 1 was about 85%.

Half-hard polyimide layer $P_2$ was then cooled down to room temperature by blowing cold air (c) at the cooling process D. Without separating half-hard polyimide layer $P_2$ from aluminum cylinder 1, the cylinder was treated to the next procedures. Even though aluminum cylinder 1 was treated individually up to these procedures, 10–100 cylinders were preferably treated at one time in a pallet in the following processes. This composition is preferable for mass-production of a polyimide composite tube of the invention.

In the dipping process E, 50 half-hard polyimide layers $P_2$ held by a gripping means 6 at the same time were dipped and held in a primer composite solution 7 in which normal fluororesin primer (for example, Teflon 855-001 or Teflon 855-300 made by Dupont, and Polyflon EK-1700, Polyflon Ek-1800 or Polyflon 1900 made by Daikin Kogyo Sha; Teflon 855-300 is used in this example) is mixed with 12% by weight of carbon black powder. The viscosity of the primer was 80 c.p. In order to adhere primer composite solution 7 to aluminum cylinder 1 at a uniform thickness, the cylinder was dipped and held in the solution while rotating the cylinder at 1 r.p.m. After rotating the cylinder for 10 seconds, aluminum cylinder 1 was lifted at 100 mm per minute. Instead of rotating the cylinder, the cylinder can be vibrated up and down. As a result, primer composite solution 7 was coated on aluminum cylinder 1 evenly, while preventing a repelling phenomenon. In this way, primer composite solution 7 can be mixed slowly at the same time.

Aluminum cylinder 1 coated with primer composite solution 7 was then heated in a drier 8 at 180° C. for 30 minutes (drying process F). After heating primer composite solution 7, the solution was cooled down to room temperature with cold air (d) during a cooling process G, thereby providing $P_3$. ($P_3$ was a tube in which primer composite solution 7 was coated on the surface of half-hard polyimide layer $P_2$.) The thickness of the primer layer after the drying process F and the cooling process G was 4 μm.

At the fluororesin coating process H, a solution 9 is prepared by adding 0.6% by weight (relative to the weight of a solid in dispersion) of KETJENBLACK (trade name: conductive carbon black invented by AKZO) into the dispersion containing 45% by weight of fluororesin, composed of 70% by weight of polytetrafluoroethylene and 30% by weight of PFA. $P_3$ was dipped and held in solution 9, thus coating the solution on the surface of the primer. The thickness of the layer made of solution 9 was about 10 μm after drying the layer. The viscosity of the dispersion was 150 c.p. Aluminum cylinder 1 was dipped and held in the dispersion for 10 seconds while rotating the cylinder at 1 r.p.m. Then, the cylinder was lifted at 100 mm per minute.

The second heating process I for directing both the process of completing the imide reaction and the process of baking a fluororesin was then carried out. After heating aluminum cylinder 1 in an oven 10 at 250° C. for 80 minutes, another 70 minutes heating treatment was applied to the cylinder at 380° C. $P_4$ is a polyimide composite tube in which the primer and the polytetrafluoroethylene were coated and baked on the surface of a hard polyimide layer on aluminum cylinder 1. Polyimide composite tube $P_4$ was cooled in the cooling process J.

Finally, by taking off polyimide composite tube $P_4$ from aluminum cylinder 1, a seamless polyimide composite tube of the invention 25 mm in inside diameter and 350 mm in length was provided. The difference in thickness in longitudinal direction was ±1 μ.

Figure 3:
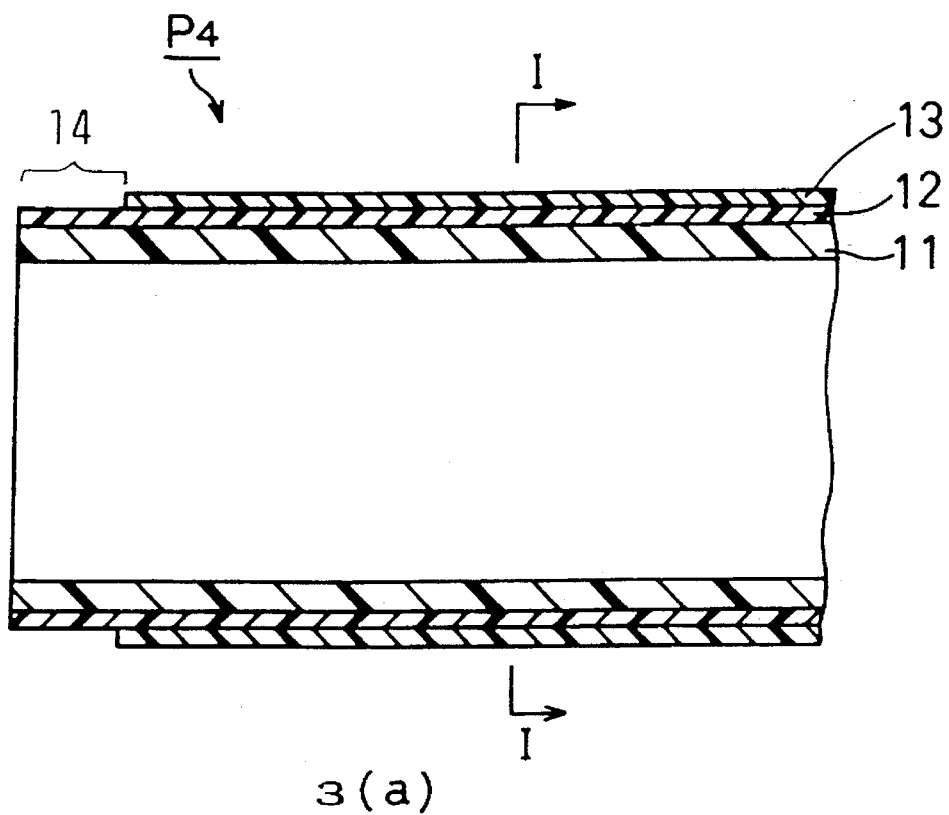
FIG. 3 shows a cross-sectional view of a polyimide composite tube of the embodiment.
Figure 3:
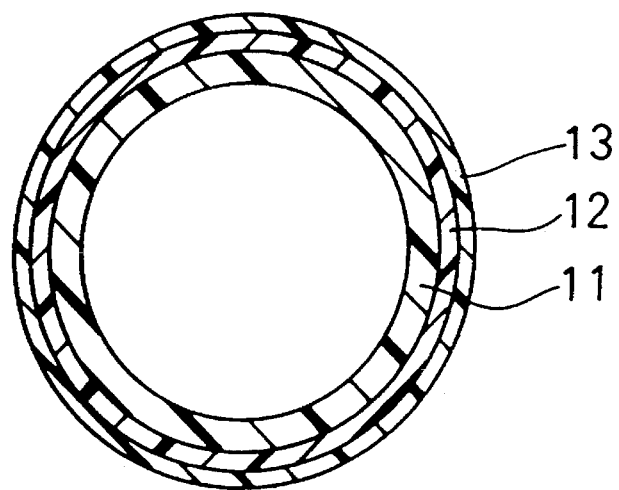

FIG. 3 shows cross-sectional views of the seamless polyimide composite tube of the invention. 3(a) shows a cross sectional view in the longitudinal direction; 3(b) shows a cross sectional view in the vertical direction (I—I). In FIG. 3, 11 is a polyimide layer (substrate); 12 is a conductive primer layer; 13 indicates a polytetrafluoroethylene layer; 14 shows an exposed area of a conductive primer layer. The surface electric resistance of conductive primer layer 14 was $1\times10^5$ Ω·cm.

Figure 4:
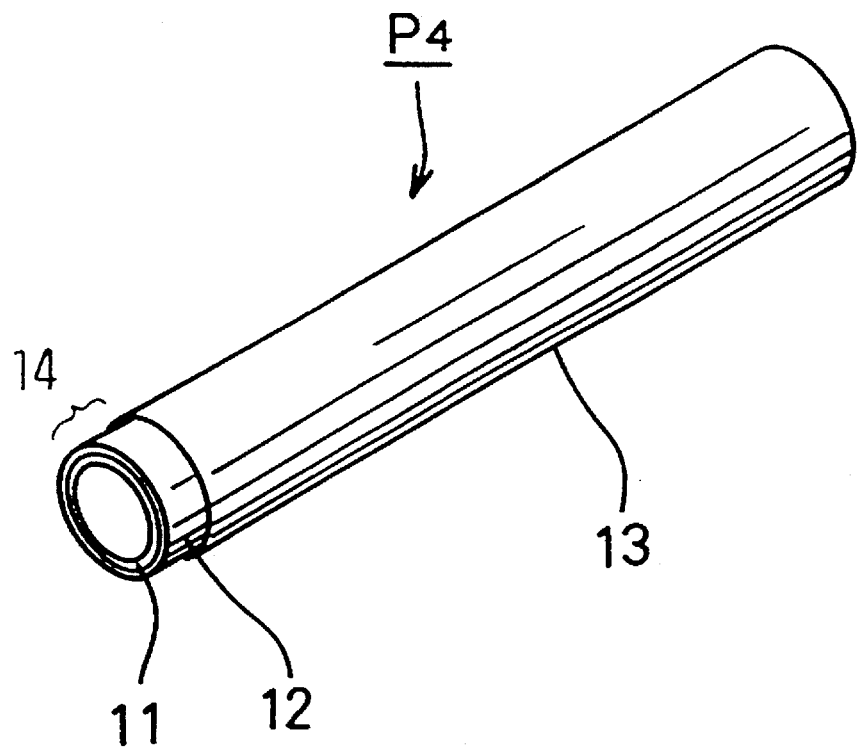
FIG. 4 shows a perspective view of a polyimide composite tube of the embodiment.

FIG. 4, in addition, shows a perspective view of a seamless polyimide composite tube of the invention. Conductive primer layer 12 is coated on the surface of polyimide layer 11; polytetrafluoroethylene layer 13 is coated on the surface of conductive primer layer 12. In this example, one edge of conductive primer layer 12 was exposed at about 10 mm. By contacting a conductive brush, or the like to this exposed area 14, static, which is generated while the seamless polyimide composite tube is running, can be discharged.

Figure 5:
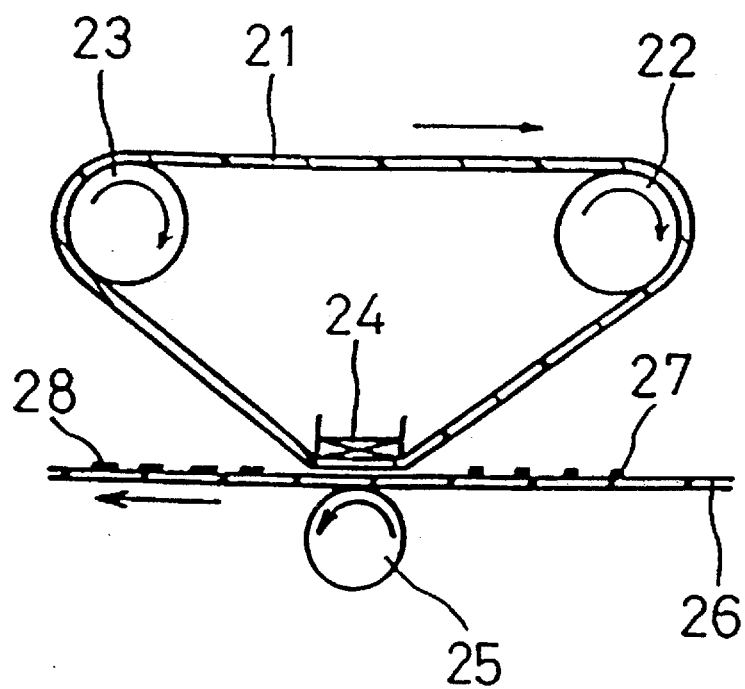
FIG. 5 shows a cross-sectional view of a fixing apparatus of an electrophotographic printer employing a polyimide composite tube of the embodiment.

The seamless polyimide composite tube of the invention was applied for the fixing apparatus of the electrophotographic printer of FIG. 5. In other words, a live roller (22), a tension roller (23), and a heater (24) were located inside the polyimide composite tube; a backing-up roller was placed outside the tube of the invention. A copying paper (26) formed with toner (28) was supplied between seamless polyimide composite tube (21) and backing-up roller (25). Then, the toner was fixed to the copying paper one after another by heater (24), thereby providing fixed figures (28) on the copying paper. The seamless polyimide composite tube of the invention is so heat-resistant, strong, and antistatic that it is very useful. For example, when the polyimide composite tube of the invention was used for a laser printer, it withstood the printing of about 100,000 sheets. Moreover, the polyimide composite tube of the present invention has a flat and smooth surface of a baked fluororesin layer (outermost layer of the tube). Therefore, when the tube of the invention was used for a laser printer, it showed excellent running properties and properties of separating toner from itself.

The polyimide precursor solution used in the invention is prepared, for example, by reacting aromatic tetracarboxylic acid and aromatic diamine in an organic polar solvent. For instance, 3,3'4,4'-biphenyltetracarboxylic acid di-anhydride: 2,3'4,4'-benzophenonetetracarboxylic acid di-anhydride; pyromellitic acid di-anhydride; or a mix of these tetracarboxylic acids can be used as aromatic tetracarboxylic acid. However, the aromatic tetracarboxylic acid is not limited to these acids. Aromatic diamines include, diphenylether diamines such as 3,3'-diaminophenylether, 3,3'-dimethoxy-4,4'-diaminodiphenylether, 4,4'-diaminophenylether and the like; diphenylthioether diamines such as 3,3'-diphenylthioether, 4,4'-diaminodiphenylthioether and the like; benzophenone diamines such as 4,4'-diaminobenzophenone and the like; m-phenylenediamine and the like can be included; and the aromatic diamine is not restricted to these diamines. N-methylpyrolidone, dimethylformamide, dimethylacetamide, phenol, o-cresol, m-cresol, p-cresol, dimethyloxide and the like are examples of suitable organic polar solvents. However, the organic polar solvent is not limited to these solvents.

Fluororesins include, for example, polytetrafluoroethylene (PTFE), tetrafluoroetheyleneperfluoroalkoxyethylene copolymer (PFA), tetrafluoroethylene-hexafluoropropylene copolymer resin (PEEP), ethylene-tetrafluoroethylene copolymer resin (PETFE), ethylene-chlorotrifluoroethylene copolymer (PECTFE), polyvinylidenefluoride (PVDF), or the like.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A polyimide composite tube for use to heat fixing belts in electrophotographic printers, comprising a seamless cast thermosetting polyimide layer as a substrate, a conductive primer layer on the surface of said polyimide layer, and a baked fluororesin layer on the surface of said conductive primer layer, said polyimide composite tube being the product of the process comprising:

coating a thermosetting polyimide precursor solution on an outside surface of a metallic cylinder, molding the coated thermosetting polyimide precursor solution with a ring die to produce a layer of uniform thickness of said thermosetting polyimide precursor solution on the surface of the metallic cylinder, generating an imide reaction in said layer by drying and heating said layer to carry said imide reaction partially to completion to form a partially cured thermosetting polyimide layer, applying a conductive primer layer and then a fluororesin layer to the partially cured polyimide layer, and heating the partially cured polyimide layer, the conductive layer and the fluororesin layer to complete the imide reaction and to bake the fluororesin layer at the same time.

2. A polyimide composite tube according to claim 1 manufactured by the steps of:

coating a polyimide precursor solution on the outside surface of a metallic cylinder;

casting the coated polyimide precursor solution with a metallic ring at a uniform thickness;

generating a halfway imide reaction by drying and heating said polyimide precursor solution coated on said metallic cylinder, thereby forming a half-hard polyimide layer;

coating a conductive primer layer and then fluororesin layer on the surface of said half-hard polyimide layer; and heating said half-hard polyimide layer coated with said conductive primer layer and fluororesin layer to complete the imide reaction and bake said fluororesin layer at the same time.

3. A polyimide composite tube according to claim 1, wherein the seamless polyimide layer has a thickness of from 3 μm to 500 μm.

4. A polyimide composite tube according to claim 1, wherein the conductive primer layer comprises at least one compound selected from the group consisting of polyphenylenesulfide, polyethersulfone, polysulfone, polyamideimide, polyimide, derivative of polyphenylenesulfide, derivative of polyethersulfone, derivative of polysulfone, derivative of polyamideimide, derivative of polyimide, and fluororesin.

5. A polyimide composite tube according to claim 1, wherein the conductive primer layer has a thickness of from 0.5 μm to 10 μm, and wherein said baked fluororesin layer covers less than the entire conductive primer layer so as to provide an exposed area of said conductive primer layer.

6. A polyimide composite tube according to claim 1, wherein the conductive primer layer has a surface electrical resistance of from $1 \times 10^{-2}$ Ω·cm to $1 \times 10^{7}$ Ω·cm.

7. A polyimide composite tube according to claim 1, wherein the conductive primer layer comprises 1–40% by weight of carbon powder.

8. A polyimide composite tube according to claim 1, wherein the fluororesin is at least one compound selected from the group consisting of polytetrafluoroethylene, tetrafluoroethylene-perfluoroalkylvinylether copolymer, and tetrafluoroethylene-hexafluoropropylene copolymer.

9. A polyimide composite tube according to claim 1, wherein the fluororesin layer has a thickness of from 2 μm to 30 μm.

10. A polyimide composite tube according to claim 1, wherein the fluororesin layer comprises 0.1–3.0% by weight of carbon powder.

11. A method of manufacturing a polyimide composite tube comprising:

coating a polyimide precursor solution on an outside surface of a metallic cylinder;

casting the coated polyimide precursor solution with a metallic ring at a uniform thickness;

generating a halfway imide reaction by drying and heating said polyimide precursor solution coated on said metallic cylinder, thus forming a half-hard polyimide layer;

coating a conductive primer layer and then fluororesin layer on the surface of said half-hard polyimide layer; and heating the half-hard polyimide layer coated with said conductive primer layer and fluororesin layer to complete the imide reaction and bake said fluororesin layer at the same time.

12. A method according to claim 11, wherein the reduction ratio of the thickness of the polyimide precursor solution at the halfway imide reaction is from 50% to 95%, and wherein said reduction ratio is expressed as follows:

$$x=\{(V_o-V_a)/V_o\}\times 100, \qquad \text{Formula A}$$

wherein x represents said reduction ratio;

$V_o$ represents the thickness of said polyimide precursor solution right after the application of said solution; and $V_a$ represents the thickness of the half-hard polyimide layer at the midway imide reaction.

13. A method according to claim 11, wherein the fluororesin is at least one compound dispersion, wherein said compound is selected from the group consisting of polytetrafluoroethylene, tetrafluoroethyleneperfluoroalkylvinylether copolymer, and tetrafluoroethylenehexafluoropropylene copolymer, and wherein said fluororesin is coated on a surface of the metallic cylinder by a dipping and holding method.

14. A method according to claim 11 or 13, wherein the fluororesin is mixed with carbon black.

15. A method according to claim 11, wherein the conductive primer is coated on a surface of the half-hard polyimide layer adhered to a surface of the metallic cylinder, and wherein the fluororesin is then coated on a surface of the conductive primer.

16. A method according to claim 11, wherein the fluororesin is coated on a surface of the conductive primer while the metallic cylinder is rotating.

17. A method according to claim 11, wherein the polyimide precursor solution is an aromatic polyimide precursor, and wherein said polyimide precursor solution has a viscosity of from 50 poise to 10000 poise.

18. A method according to claim 11, wherein the coated polyimide precursor solution has a thickness of from 10 μm to 1000 μm.

19. A method according to claim 11, wherein a metallic mold is arranged outside of the metallic cylinder at a constant distance, and wherein at least one of said metallic cylinder and said metallic mold is shifted, thus molding the polyimide precursor solution on the surface of said metallic cylinder at a uniform thickness.

20. A method according to claim 11, wherein the conductive primer layer comprises 1–40% by weight of carbon powder.

21. A method according to claim 11, wherein the conductive primer is coated on the surface of the half-hard polyimide layer while the metallic cylinder is rotating.

* * * * *